United States Patent
Park et al.

(10) Patent No.: US 8,200,293 B2
(45) Date of Patent: Jun. 12, 2012

(54) MOBILE PHONE CRADLE AND VEHICLE INCLUDING THE SAME

(75) Inventors: Dong-Jin Park, Daegu (KR); Byung Kyu Yoon, Ansan-si (KR); Hong Sik Chang, Hwaseong-si (KR); Hun Soo Kim, Whasung-si (KR); Hae Ryong Kim, Incheon (KR); Hee Jun Jeong, Whasung-si (KR)

(73) Assignees: Hyundai Motor Company, Seoul (KR); Ecoplastic Corporation, Gyeongji-Si (KR)

( * ) Notice: Subject to any disclaimer, the term of this patent is extended or adjusted under 35 U.S.C. 154(b) by 411 days.

(21) Appl. No.: 12/622,960

(22) Filed: Nov. 20, 2009

(65) Prior Publication Data

US 2011/0053660 A1    Mar. 3, 2011

(30) Foreign Application Priority Data

Sep. 1, 2009  (KR) .......................... 10-2009-0082171

(51) Int. Cl.
*H04M 1/00* (2006.01)
(52) U.S. Cl. ................ 455/575.1; 455/569.2; 455/575.9
(58) Field of Classification Search .................. 455/90.3, 455/344–349, 569.1–569.2, 575.1, 575.9
See application file for complete search history.

(56) References Cited

U.S. PATENT DOCUMENTS

| 5,940,502 | A * | 8/1999 | Hirai et al. ..................... 379/446 |
| 5,996,866 | A * | 12/1999 | Susko et al. .................. 224/281 |
| 7,162,281 | B2 * | 1/2007 | Kim ........................... 455/575.1 |
| 8,078,237 | B2 * | 12/2011 | Bury .......................... 455/575.1 |
| 2009/0117946 | A1 * | 5/2009 | Tomasini et al. .......... 455/569.2 |

FOREIGN PATENT DOCUMENTS

| JP | 2001-45129 A | 2/2001 |
| JP | 2003-63317 A | 3/2003 |
| JP | 2004-106794 A | 4/2004 |
| KR | 20-0144795 Y1 | 2/1999 |
| KR | 10-0590164 B1 | 6/2006 |
| KR | 10-2007-0060191 A | 6/2007 |
| WO | WO 99/19166 A1 | 4/1999 |

* cited by examiner

*Primary Examiner* — Simon Nguyen
(74) *Attorney, Agent, or Firm* — Morgan, Lewis & Bockius LLP

(57) ABSTRACT

A mobile phone cradle may include a housing, a lower body displaceably received in the housing, an upper body rotatably fixed to an upper portion of the lower body and displaceably received in the housing, wherein a mobile phone is held on the upper body, a first elastic member, wherein one end of the first elastic member is selectively wound around a roller rotatably mounted on the housing to move the lower body upwards and the other end of the elastic member is fixed to the lower body, a fixing member selectively fixing the lower body to the housing, and a moving unit guiding displacement of the lower body along the housing, wherein the upper body is rotated at a predetermined angle when taken out of the housing by the first elastic member.

13 Claims, 7 Drawing Sheets

MOBILE PHONE CRADLE AND VEHICLE INCLUDING THE SAME

CROSS REFERENCE TO RELATED APPLICATION

The present application claims priority to Korean Patent Application Number 10-2009-0082171 filed on Sep. 1, 2009, the entire contents of which application is incorporated herein for all purposes by this reference.

BACKGROUND OF THE INVENTION

1. Field of the Invention

The present invention relates to a mobile phone cradle and a vehicle including the same, and more particularly, to a mobile phone cradle, which allows a mobile phone not only to be easily held thereon but also to be used even after held thereon, and a vehicle including the same.

2. Description of Related Art

As mobile phones are frequently used in vehicles due to their ever-increasing popularity, a variety of storage structures have been developed in order to provide a variety of conveniences to drivers when they use a mobile phone. Most of the developed structures generally include a storage space, which is provided inside a place around the driver's seat to hold a mobile phone, and a handsfree cable equipped adjacent to the storage space. When a driver is seated in a vehicle, he/she can connect the handsfree cable to a mobile phone and place the mobile phone in the storage space. Then, the driver can answer a call "handsfree" while driving the vehicle.

As a different scheme, a mobile phone cradle, on which a mobile phone can be held, is fixedly provided on the interior of a vehicle so that a driver can quickly answer a call while driving the vehicle. However, the conventional mobile phone cradle inevitably causes damage to the crash panel, that is, the front panel of the driver's seat of the vehicle, since it is typically fixed by bolts to the crash panel. The mobile phone cradle is configured to securely hold the mobile phone in order to prevent the mobile phone from dropping during driving. Typically, the mobile phone cradle holds the rear part of the mobile phone by interference fit. Unlike a vehicle cup mount, which is stored inside an interior part of the vehicle and can be used whenever it is necessary, the conventional mobile phone cradle fixed by bolts is necessarily exposed and fixed to the front panel of the driver's seat. As a result, the mobile phone cradle has several problems. For example, the mobile phone cradle occupies a certain area of the interior of the vehicle, may interfere with driving, and diminishes aesthetic appearance.

In addition, once the conventional mobile phone cradle is installed in the vehicle, it cannot be freely separated from the vehicle. If the mobile phone cradle is separated from the vehicle, bolt holes are left in the crash panel. The crash panel may be damaged due to excessive boring during the fixing operation, thereby diminishing aesthetic appearance. In some cases, the badly-damaged crash panel may reduce the resale value of the vehicle. Furthermore, the conventional mobile phone cradle is inconvenient to use since it is spaced too far from the driver. Since it is difficult to separate the mobile phone from the cradle due to the secure fitting between the cradle and the mobile phone, the driver may frequently leave the mobile phone in the vehicle. If the driver attempts to remove the mobile phone from the cradle while driving, he/she may fail to pay attention to what is in front of the vehicle, increasing the possibility of a serious accident.

Furthermore, the conventional mobile phone cradle is shaped corresponding to the rear part of the mobile phone and is sized the same as or greater than that of the rear part of the mobile phone. This leads to a bulky and expensive mobile phone cradle. Since different types of mobile phones have different dimensions, a mobile phone cradle dedicated to a specific mobile phone has to be selected. In addition, the mobile phone cradle cannot be used for applications other than the storage of the mobile phone.

Moreover, when the driver attempts to check the charged state of the mobile phone or a short message, the conventional mobile phone cradle makes it difficult to open the mobile phone.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention provide a mobile phone cradle, which ensures a space on which a mobile phone can be held, and a vehicle including the same.

There is also provided a mobile phone cradle, which ensures a space on which various sizes of mobile phones can be held, and which is not exposed when a mobile phone is not held, and a vehicle including the same.

There is also provided a mobile phone cradle, by which a user can easily watch the screen of a mobile phone, and a vehicle including the same.

In an aspect of the present invention, the mobile phone cradle may include a housing, a lower body displaceably received in the housing, an upper body rotatably fixed to an upper portion of the lower body and displaceably received in the housing, wherein a mobile phone is held on the upper body, a first elastic member, wherein one end of the first elastic member is selectively wound around a roller rotatably mounted on the housing to move the lower body upwards and the other end of the elastic member is fixed to the lower body, a fixing member selectively fixing the lower body to the housing, and a moving unit guiding displacement of the lower body along the housing, wherein the upper body is rotated at a predetermined angle when taken out of the housing by the first elastic member, wherein the first elastic member is a leaf spring.

The upper body may have a torsional elastic member and a shaft on which the torsional elastic member is mounted and when a compressive force applied to the torsional elastic member is removed, the torsional elastic member returns to an original position when the upper body is taken out of the housing, wherein the upper body has a support member pivotally coupled to the upper body by the shaft and engaged with the torsional elastic member for supporting a lower part of the mobile phone, and wherein the support member elastically biased toward the housing when the lower body is mounted in the housing, is rotated downwards by the torsional elastic member, thereby protruding from the upper body when the upper body is taken out of the housing by the first elastic member, and wherein a rotational direction of the upper body is opposite to a rotational direction of the support member.

The upper body may include at least a holder pivotally coupled thereto for supporting opposite sides of the mobile phone, and wherein the at least a holder is rotated downwards by actuating force of the torsional elastic member, thereby protruding from the upper body, when the upper body is taken out of the housing by the first elastic member, wherein a rotational direction of the upper body is opposite to a rotational direction of the at least a holder, wherein the at least a holder includes two holders, an interval between which is adjustable by a second elastic member, and wherein the second elastic member includes a tension coil spring.

The fixing member may include a protrusion extending from the lower body toward the housing, and a heart cam mounted on an inner surface of the housing, wherein the heart cam forms a groove along which the protrusion selectively moves.

The moving unit may include a pinion rotatably coupled to the lower body and a rack corresponding to the pinion, the rack being formed on an inner surface of the housing.

In another aspect of the present invention, a vehicle may include a console located adjacent to an armrest, and a mobile phone cradle provided in the console, wherein the mobile phone cradle includes, a housing received in the console, a lower body displaceably received in the housing, an upper body rotatably fixed to an upper portion of the lower body, wherein a mobile phone is held on the upper body, a leaf spring, wherein one end of the leaf spring is selectively wound around a roller mounted to the housing and the other end of the leaf spring is fixed to the lower body, a fixing member selectively fixing the lower body to the housing, and a moving unit guiding displacement of the lower body inside the housing, wherein the upper body is rotated at a predetermined angle when taken out of the housing by the leaf spring.

According to various aspects of the present invention, various sizes of mobile phones can be held on the mobile phone cradle, and a mobile phone holding structure is not exposed to the outside when a mobile phone is not held.

In addition, the user can easily watch the screen of the mobile phone since the mobile phone can be fixed with a specific angle of inclination.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE INVENTION

Figure 1:
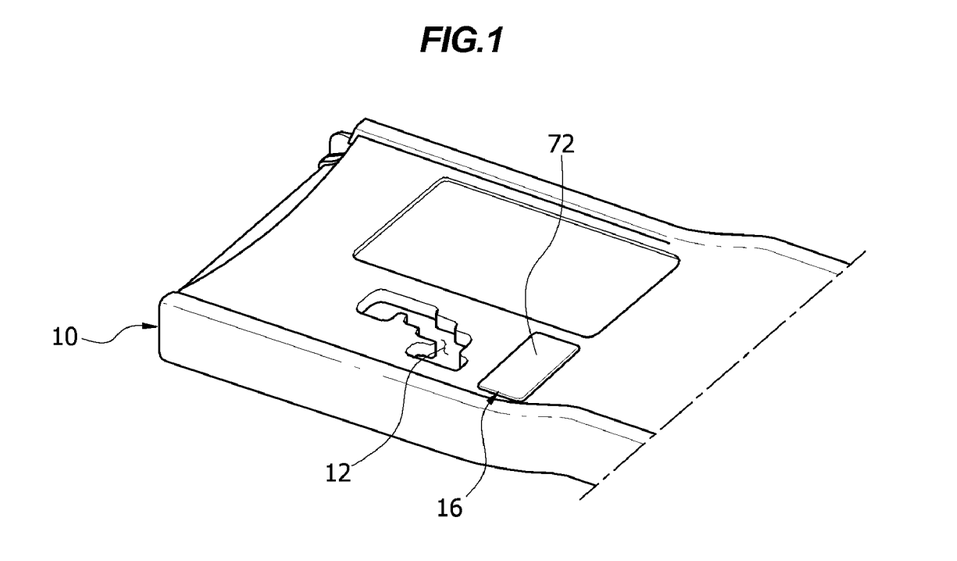
FIG. 1 is a perspective view illustrating a console in which a mobile phone cradle in according with an exemplary embodiment of the invention is provided.

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention (s) is/are intended to cover not only the exemplary embodiments, but also various alternatives, modifications, equivalents and other embodiments, which may be included within the spirit and scope of the invention as defined by the appended claims FIG. 1 is a perspective view illustrating a console 10 in which a mobile phone cradle 16 in accordance with an exemplary embodiment of the invention is provided. Below, a description will be given of the console 10 and the mobile phone cradle 16 with reference to FIG. 1.

The console 10, as shown in FIG. 1, is located adjacent to an armrest and is equipped with a gear stick (not shown). A through-hole 12, which guides the shift of the gear stick, is formed in the console 10. In addition, the console 10 has the mobile phone cradle 16 in one portion thereof such that the user can watch the screen of a mobile phone or easily operate the mobile phone after the mobile phone is held on the mobile phone cradle 16.

In FIG. 1, the bodies of the mobile phone cradle 16 are completely received in a housing, and only a cover 72 is exposed to the outside. Specifically, in the state where the mobile phone is not held, the mobile phone cradle in accordance with an exemplary embodiment of the invention is completely refracted into the console 10 without exposing its body. In contrast, when the user intends to hold the mobile phone on the mobile phone cradle 16, he/she can use the mobile phone cradle 16 by taking it out of the console 10.

The cover 72 can be made of Acrylonitrile Butadiene Styrene (ABS).

Figure 2:
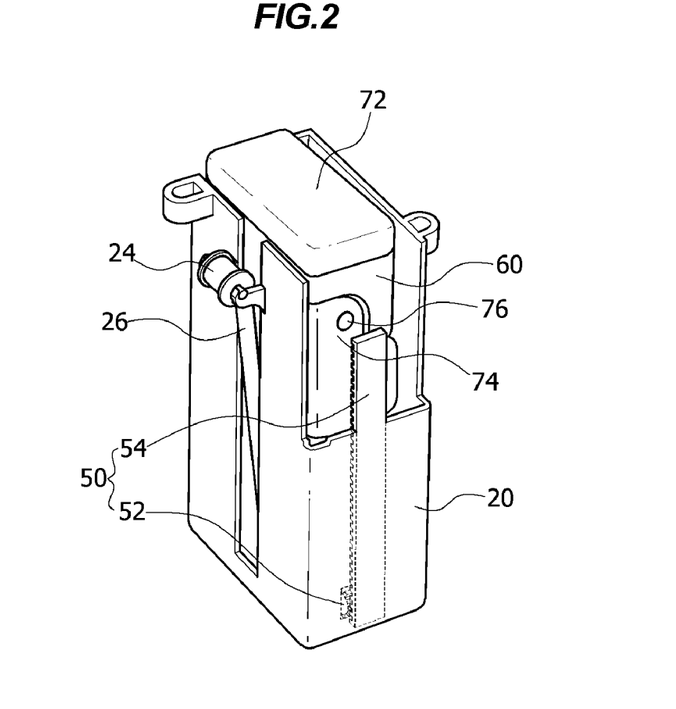
FIG. 2 is a perspective view of the mobile phone cradle shown in FIG. 1, in which the bodies are received in the housing.
Figure 3:
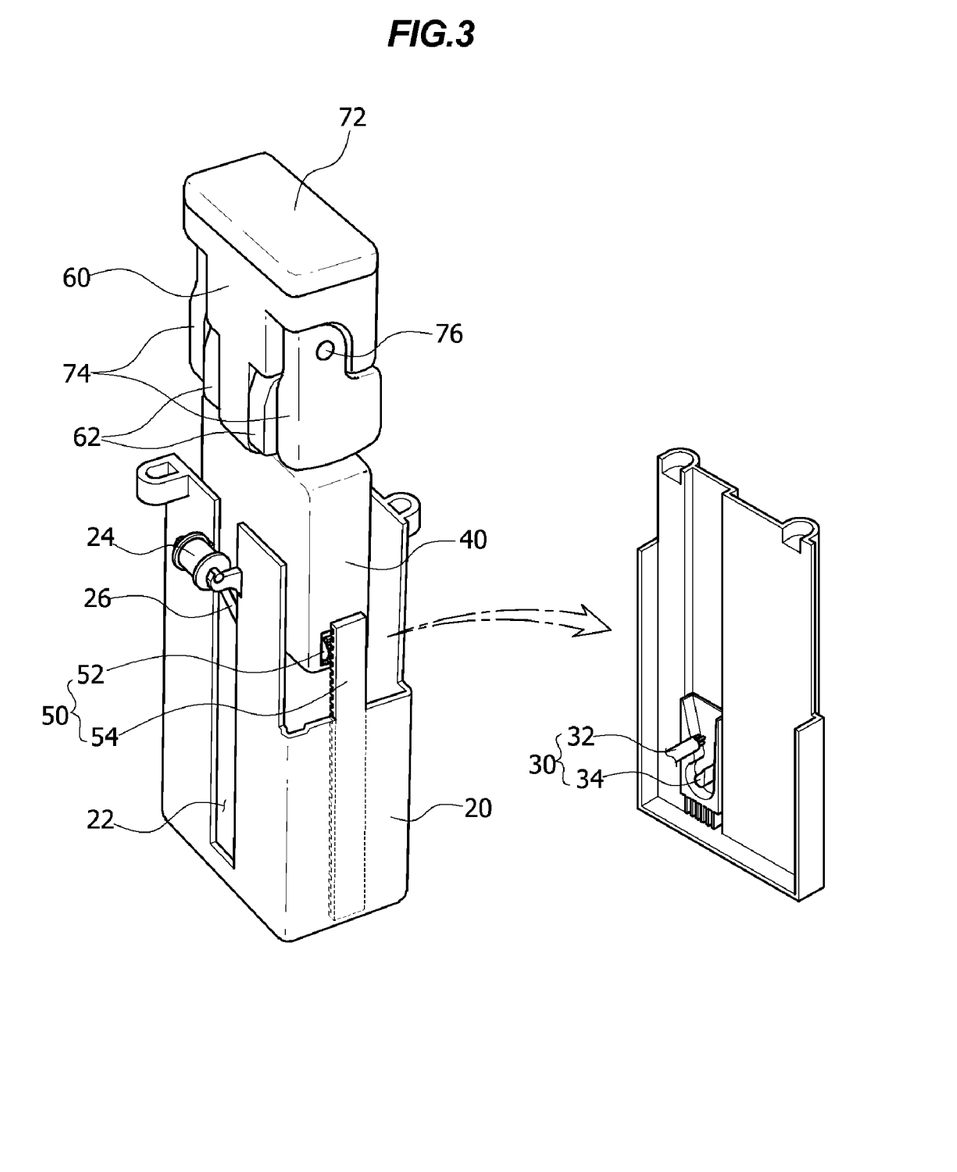
FIG. 3 is a perspective view subsequent to FIG. 2, in which the bodies are taken out of the housing.
Figure 4:
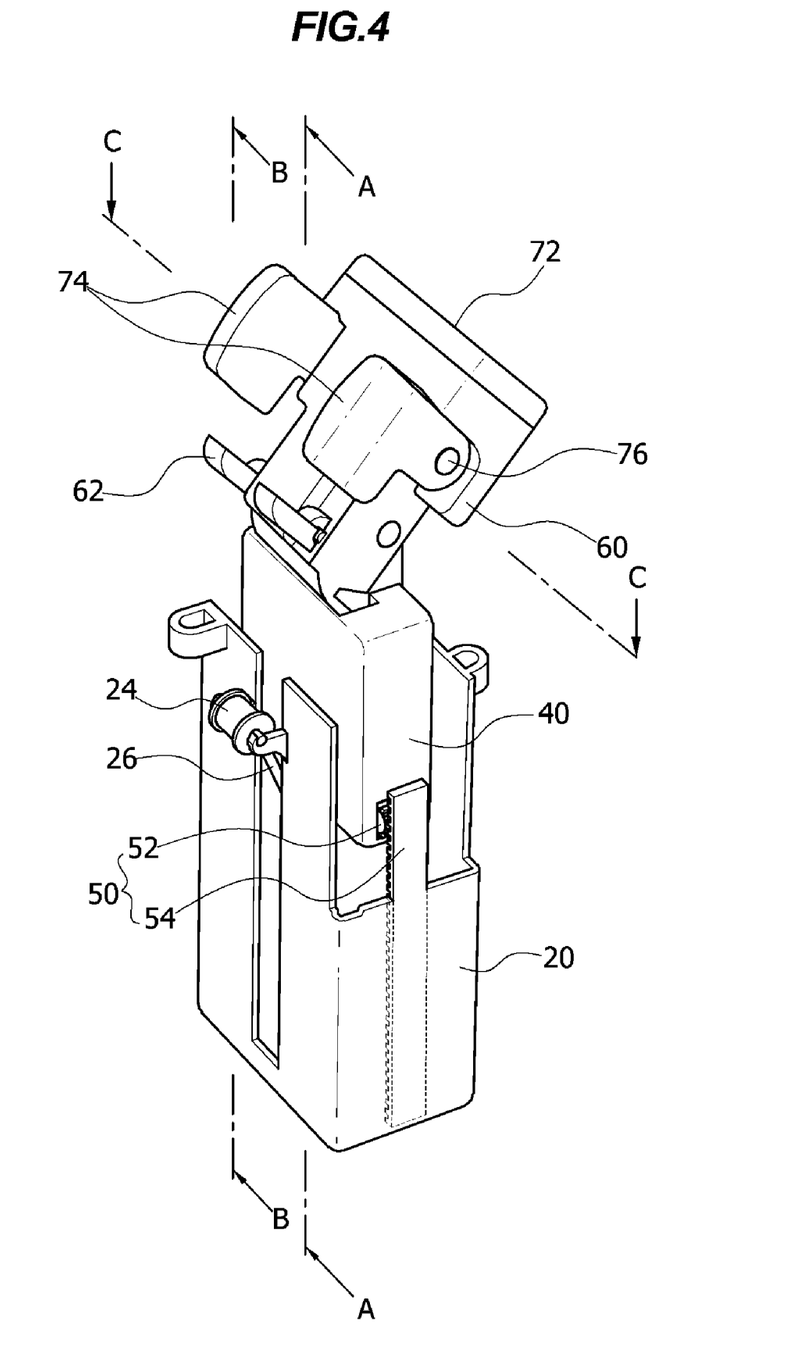
FIG. 4 is a perspective view subsequent to FIG. 3, in which the upper body is rotated with respect to the lower housing.

FIG. 2 is a perspective view of the mobile phone cradle shown in FIG. 1, in which the bodies 40 and 60 are received in the housing 20, FIG. 3 is a perspective view subsequent to FIG. 2, in which the bodies 40 and 60 taken out of the housing 20, and FIG. 4 is a perspective view subsequent to FIG. 3, in which the upper body 60 is rotated with respect to the lower housing 40. Specifically, FIG. 2 shows the state before the user pushes the cover provided on top of the mobile phone cradle, and FIGS. 3 and 4 each illustrate a process step in which the upper body springs out of the housing after the user pushed the cover. Below, a description will be given of the mobile phone cradle with reference to FIGS. 2 to 4.

The mobile phone cradle in accordance with an exemplary embodiment of the invention includes the housing 20 and the lower and upper bodies 40 and 60 received in the housing 20. The housing 20 is mounted so as to be received in the vehicle console 10 shown in FIG. 1. In addition, the housing 20 has an inner space 22 capable of receiving the lower body 40 and the upper body 60 therein. Before the user pushes the cover 72, the upper body 60 and the lower body 40 are received in the housing 20, arranged in one line.

The housing 29 can be made of PPF. The housing 20 has a general box-like configuration with one open side. The lower body 40 is received in the housing 20 and is displaceable upward and downward inside the housing 20.

In addition, the mobile phone cradle in accordance with an exemplary embodiment of the invention includes a fixing member 30 fixing the position of the lower body 40 inside the housing 20 and a moving unit 50 guiding the displacement of the lower body 40 inside the housing 20.

The fixing member 30 includes a protrusion 32 extending backward from the rear surface of the lower body 40 and a heart cam 34 mounted on the inner surface of the housing 20. The heart cam 34 forms a groove that guides the protrusion 32. Since it is difficult to illustrate the shape of the heart cam 34 according to the orientation of the mobile phone cradle in FIG. 3, the heart cam 34 and the protrusion 32 movable inside the heart cam 34 are shown in an enlarged view. The protrusion 32 serves to fix the lower body 40 in position or release the fixed lower body 40 while moving along the groove formed in the heart cam 34.

The protrusion 32 moves together with the lower body 40 when the lower body 40 is displaced upward and downward. As such, the groove of the heart cam 34 is shaped to fix the position of the lower body 40. Accordingly, the lower body 40 can be fixed to the lower end of the housing 20 when the protrusion 32 is located at a specific position of the heart cam 34 and be located at the upper end of the housing when the protrusion 32 is located at a different position of the heart cam 34. The technology of fixing the position of a component or releasing the fixed component using the heart cam 34 will not be described in detail since it is well known to those skilled in the art.

The moving unit 50 includes a pinion 52 provided on the lower body 40 and a rack 54 mounted inside the housing 20, corresponding to the pinion 52. The vertical displacement of the lower body 40 is guided by the pinion 52, which rotates in mesh with teeth in the rack 54.

Since the pinion 52 is rotatably provided on the lower body 40, the lower body 40 can be displaced vertically when the pinion 52 moves along the rack 54. In particular, multiple pinions 52 and racks 54 can be provided, as necessary, in the moving unit 50 in order to stably displace the lower body 40. The moving unit 50 can be located on the front, rear or side surface of the lower body 40.

The rack 54 can have a stopper protrusion (not shown) on one end thereof, which prevents the pinion 52 from moving beyond the length of the rack 54. The stopper protrusion can limit the distance that the pinion 52 can move as well as the displacement of the lower body 40, thereby preventing the lower body 40 from escaping from the housing 20.

The moving unit 50 can be implemented with any members that can provide a passage along which the lower body 40 can be stably displaced upward and downward.

The mobile phone cradle in accordance with an exemplary embodiment of the invention also includes a leaf spring 26 wound around a roller 24, of which one end is fixed to the lower body 40 and the other end is mounted on the housing 20. The roller 24 mounted on one end of the leaf spring 26 is rotatable, and is fixedly provided on the outer surface of the housing 20. The roller 24 can apply an elastic force to the lower body 40 since it has a restoring force for winding the leaf spring 26.

The leaf spring 26 is provided on the other end with a fixing protrusion 28 (see FIG. 6), which is mounted on the lower end of the lower body 40. The fixing protrusion 28 is moved along with the upward and downward displacement of the lower body 40. Specifically, when the lower body 40 is displaced upward, the leaf spring 26 is wound around the roller 24. In contrast, when the lower body 40 is displaced downward, the leaf spring 26 is extended in length, unwound from the roller 24. As such, the leaf spring 26 can always remain tight.

The upper body 60 is rotatably fixed to the upper portion of the lower body 40. As shown in FIG. 2, the upper body 60 and the lower body 40 are located in line when they are received in the housing 20. The upper body 60 and the lower body 40 are then received according to the inner shape of the housing 20.

In contrast, the upper body 60 can be rotated at a specific angle with respect to the lower body 40 when the upper body 60 is taken out of the housing 20. In this position, the lower body 40 and the upper body 60 are coupled with each other about one rotary axis. The lower body 40 and the upper body 60 can rotate with respect to each other as the upper body 60 is raised upward by a separate gear member. Otherwise, the lower and upper bodies 40 and 60 can rotate with respect to each other by the force of the user's hand. Since the lower body 40 is displaceable only in the upward and downward directions by the moving unit 50, the upper body 60 rotates with respect to the lower body 40. Specifically, the upper body 60 can rotate at about 45°.

Support members 62 are rotatably mounted on the upper body 60 to support the lower part of a mobile phone. The support members 62 are folded to be adjacent to the upper body 60 in the position shown in FIGS. 2 and 3, and rotate downward, protruding perpendicular to the upper body 60, in the position shown in FIG. 4. The support members can be made of ABS. In addition, multiple support members can be provided, as necessary.

Holders 74 are rotatably mounted on the upper body 60 to support opposite side surfaces of the mobile phone. Specifically, two holders 74 can be provided.

With this configuration as described above, the mobile phone can be held on the mobile phone cradle, with the lower end supported by the support members 62, the opposite side surfaces by the holders 74, and the rear surface by the upper body 60.

Figure 5:
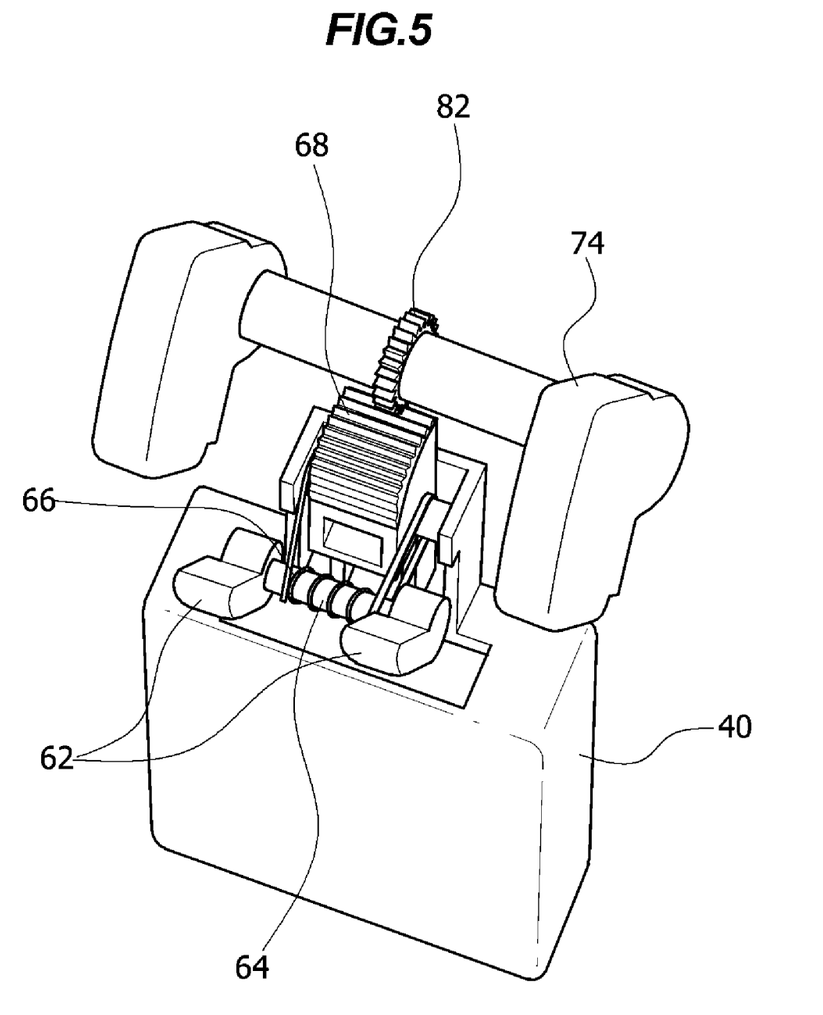
FIG. 5 is a perspective view illustrating important parts of the mobile phone cradle shown in FIG. 4.

FIG. 5 is a perspective view illustrating important parts of FIG. 4. For reference, FIG. 5 shows the inside of the parts where the support members are mounted. Below, a description will be given of the mobile phone cradle with reference to FIG. 5.

The upper body 60 includes a torsion coil spring 66 and a shaft 64 on which the torsion coil spring 66 is mounted.

The torsion coil spring 66 is elastic to torsional moment; i.e., the torsion coil spring 66 is deformed when a turning force about the shaft 64 is applied and returns to the original position when the turning force is removed. The torsion coil spring 66 can be a torsion coil spring that is generally used in the mechanical industry.

When the upper body 60 is taken out of the housing 20, a compressive force applied to the torsion coil spring 66 is removed so that the torsion coil spring 66 returns to the original shape. This is because that the upper body 60 is required to remain in line with the lower body 40 if the upper body 60 is inside the housing 20.

Figure 6:
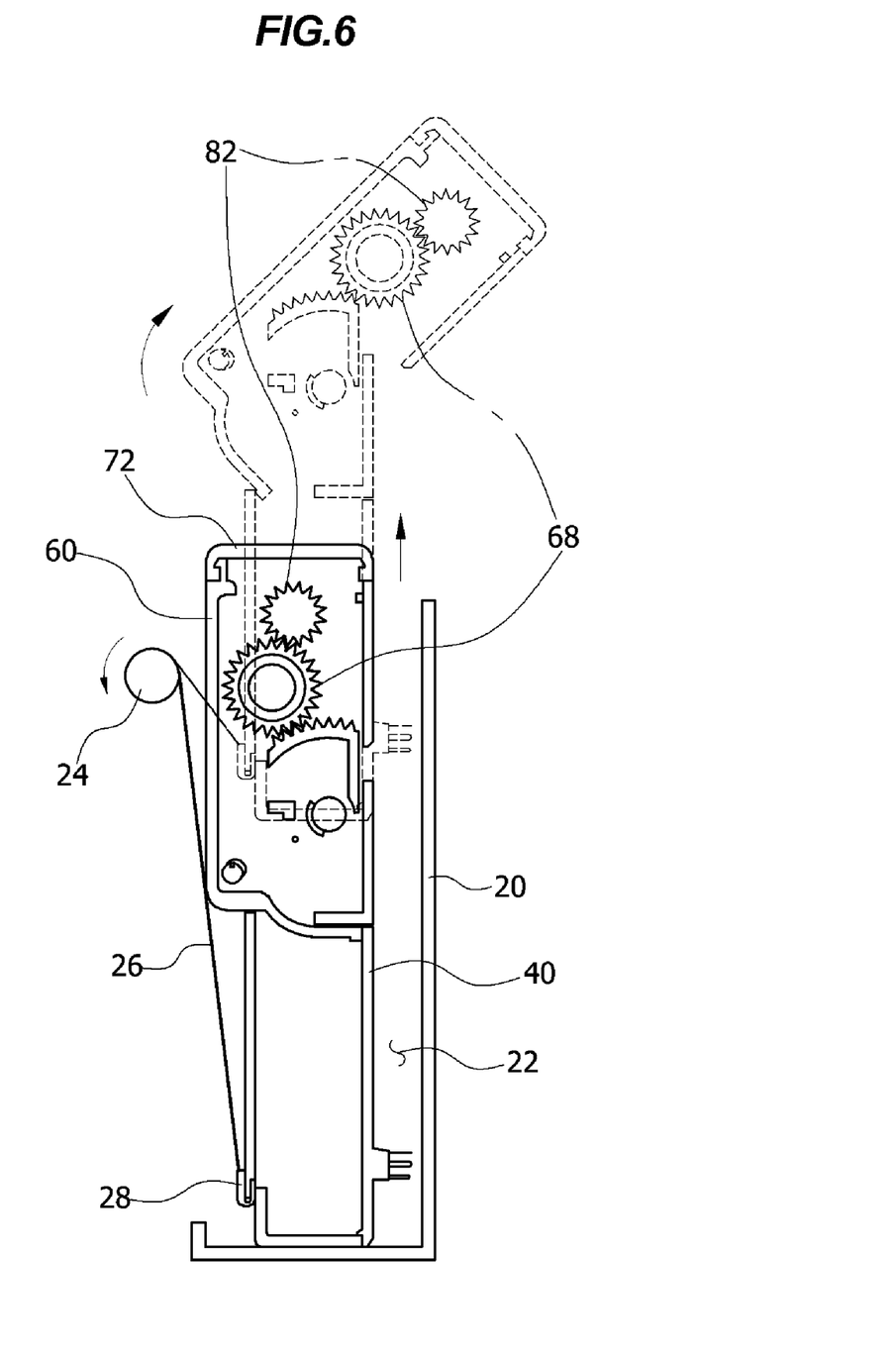
FIG. 6 is a cross-sectional view taken along line A-A in FIG. 4.

FIG. 6 is a cross-sectional view taken along line A-A in FIG. 4. Below, a description will be given of the mobile phone cradle with reference to FIG. 6. FIG. 6 shows the state where the upper body 60 is received in the housing 20, together with the state where the upper body 60 is rotated and taken out of the housing 20 (dotted lines).

Before the mobile phone cradle is in use, the lower body 40 and the upper body 60 are received in line inside the housing 20. When the user pushes the cover of the upper body 60 to use the mobile phone cradle, the protrusion 32 moves inside the heart cam 34, released from the fixed state by the heart cam 34 (see FIG. 3). The protrusion 32 and the heart cam 34 are omitted from FIG. 6 for the sake of brevity.

The lower body 40 is not fixed to the bottom of the housing 20 such that both the lower and upper bodies 40 and 60 are raised when the leaf spring 26 is wound around the roller 24. At the same time, the upper body 60 can be rotated at a specific angle by an additional structure or by the force of the user's hand.

Figure 7:
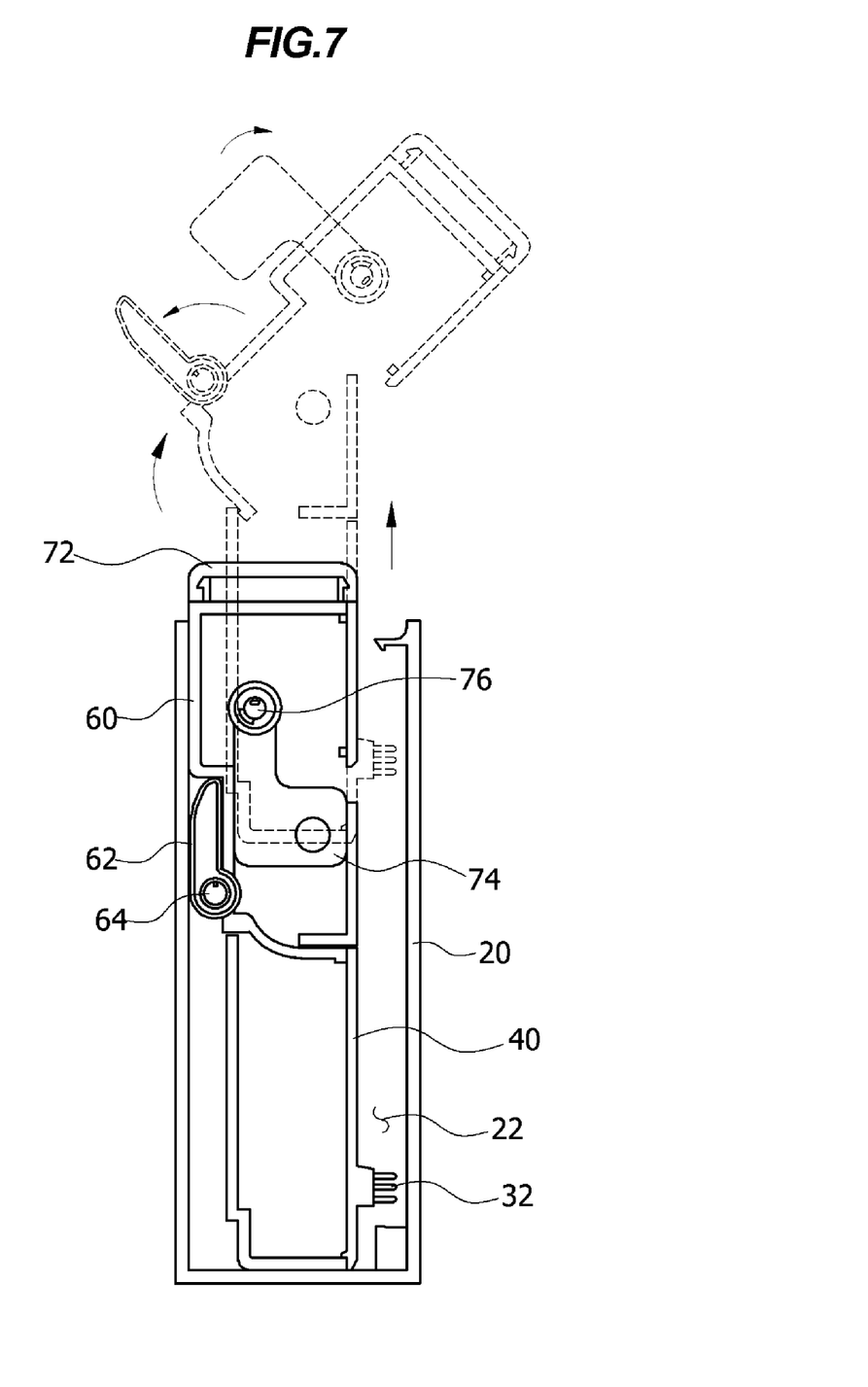
FIG. 7 is a cross-sectional view taken along line B-B in FIG. 4.

FIG. 7 is a cross-sectional view taken along line B-B in FIG. 4. Below, a description will be given of the mobile phone cradle with reference to FIG. 7 together with FIG. 5 above. FIG. 7 shows the state where the upper body 60 is received in the housing 20, together with the state where the upper body 60 is rotated and taken out of the housing 20 (dotted lines), as illustrated in FIG. 6. Since the operation of the upper body 60 was described with reference to FIG. 6, the operation of the support members 62 and the holders 74 will be described hereinafter.

When the upper body 60 is taken out of the housing 20, the support members 62 protrude from the upper body 60, rotated downward by the torsion coil spring 66.

Likewise, when the upper body 60 is taken out of the housing 20, the holders 74 protrude from the upper body 60, rotated upward by the torsion coil spring 66.

Since the compressive force applied to the coil spring 66 is removed when the upper body 60 is taken out of the housing, the torsion coil spring 66 returns to the original position as shown in FIG. 5. The support members 62 are rotated downward since their one ends are mounted on the torsion coil spring 66. In contrast, when the upper body 60 is retracted again into the housing 20, the torsion coil spring 66 is compressed and the support members 62 are rotated and folded upward.

Likewise, when the upper body 60 is taken out of the housing 20, the holders 74 are rotated upward by the gear mechanism shown in FIG. 5. In contrast, when the upper body 60 is retracted into the housing 20, the torsion coil spring 66 is compressed and the holders 74 are rotated and folded downward.

The torsion coil spring 66 is fixed at one end to a specific fixing surface of the upper body 60 and at the other end to the support member 62 such that the support member 62 is rotatable. In addition, the shaft 64, on which the torsion coil spring 66 is mounted, can be connected to a gear 68 by a chain (not shown). When the compressive force is removed from the torsion coil spring 66, the shaft 64 is rotated counterclockwise, the gear 68 connected to the shaft 64 by the chain is also rotated counterclockwise, and finally a gear 82 connected to the holders 74 is rotated clockwise. In this fashion, the holders 74 can be rotated clockwise.

Figure 8:
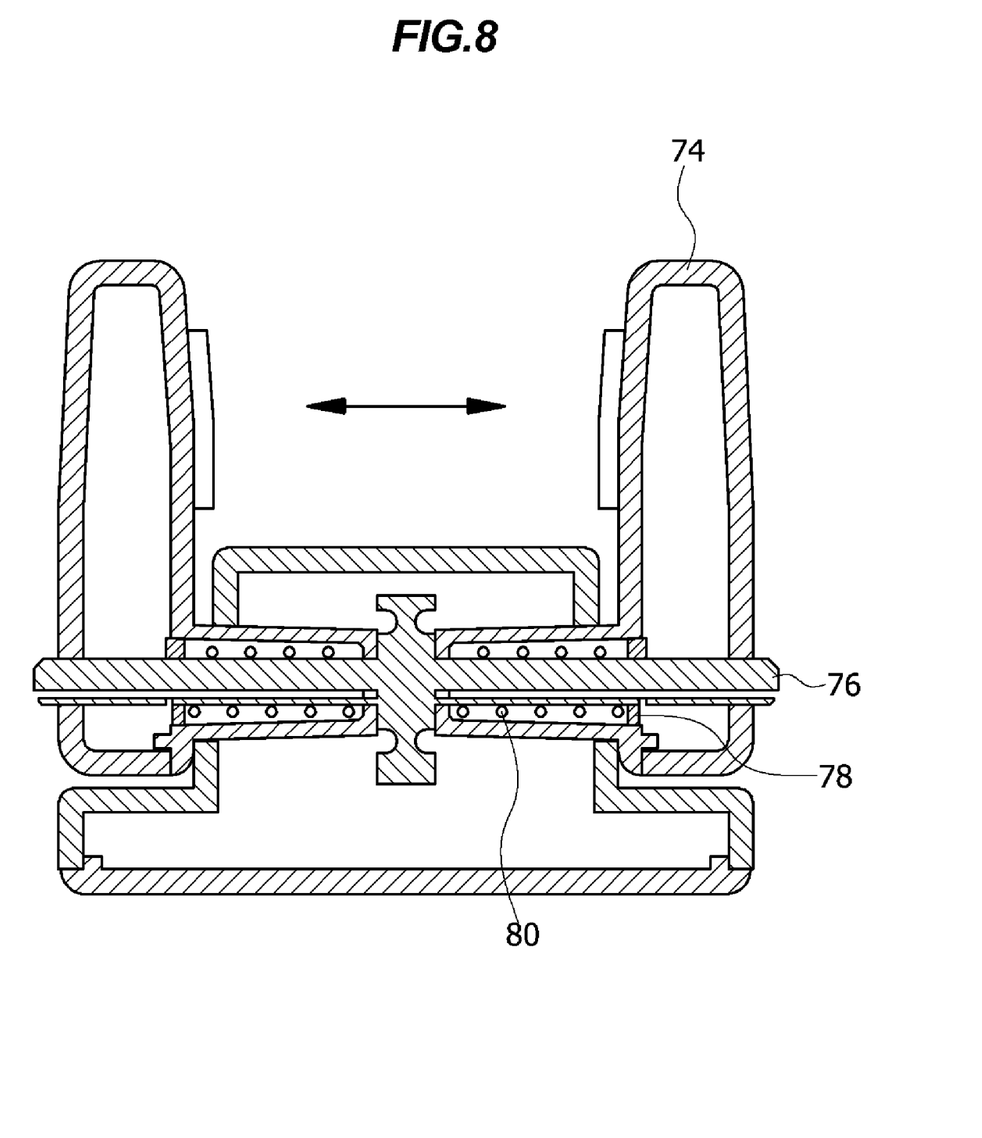
FIG. 8 is a cross-sectional view taken along line C-C in FIG. 4.

FIG. 8 is a cross-sectional view taken along line C-C in FIG. 4. Below, a description will be given of the mobile phone cradle with reference to FIG. 8.

In accordance with an exemplary embodiment of the invention, the interval between the two holders 74 can be adjusted by tension coil springs 80.

The tension coil springs 80 are mounted on the outer circumference of the shaft 76 of the holders 74, with one end of each spring 80 fixed to a protrusion 78. The tension coil springs 80 are subjected to tensile strain when a tensile force is applied in the axial direction but are compressed to the original shape when the tensile force is removed.

Accordingly, the interval between the holders 74 can be variously increased or reduced to stably fix the mobile phone.

For convenience in explanation and accurate definition in the appended claims, the terms "upper", "lower", "upward" and "downward" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A mobile phone cradle comprising:
   a housing;
   a lower body displaceably received in the housing;
   an upper body rotatably fixed to an upper portion of the lower body and displaceably received in the housing, wherein a mobile phone is held on the upper body;
   a first elastic member, wherein one end of the first elastic member is selectively wound around a roller rotatably mounted on the housing to move the lower body upwards and the other end of the elastic member is fixed to the lower body;
   a fixing member selectively fixing the lower body to the housing; and
   a moving unit guiding displacement of the lower body along the housing,
   wherein the upper body is rotated at a predetermined angle when taken out of the housing by the first elastic member.

2. The mobile phone cradle in accordance with claim 1, wherein the first elastic member is a leaf spring.

3. The mobile phone cradle in accordance with claim 1, wherein the upper body has a torsional elastic member and a shaft on which the torsional elastic member is mounted and when a compressive force applied to the torsional elastic member is removed, the torsional elastic member returns to an original position when the upper body is taken out of the housing.

4. The mobile phone cradle in accordance with claim 3, wherein the upper body has a support member pivotally coupled to the upper body by the shaft and engaged with the torsional elastic member for supporting a lower part of the mobile phone, and wherein the support member elastically biased toward the housing when the lower body is mounted in the housing, is rotated downwards by the torsional elastic member, thereby protruding from the upper body when the upper body is taken out of the housing by the first elastic member.

5. The mobile phone cradle in accordance with claim 4, wherein a rotational direction of the upper body is opposite to a rotational direction of the support member.

6. The mobile phone cradle in accordance with claim 3, wherein the upper body includes at least a holder pivotally coupled thereto for supporting opposite sides of the mobile phone, and wherein the at least a holder is rotated downwards by actuating force of the torsional elastic member, thereby protruding from the upper body, when the upper body is taken out of the housing by the first elastic member.

7. The mobile phone cradle in accordance with claim 6, wherein a rotational direction of the upper body is opposite to a rotational direction of the at least a holder.

8. The mobile phone cradle in accordance with claim 6, wherein the at least a holder includes two holders, an interval between which is adjustable by a second elastic member.

9. The mobile phone cradle in accordance with claim 8, wherein the second elastic member includes a tension coil spring.

10. The mobile phone cradle in accordance with claim 1, wherein the fixing member includes:
- a protrusion extending from the lower body toward the housing; and
- a heart cam mounted on an inner surface of the housing, wherein the heart cam forms a groove along which the protrusion selectively moves.

11. The mobile phone cradle in accordance with claim 1, wherein the moving unit includes a pinion rotatably coupled to the lower body and a rack corresponding to the pinion, the rack being formed on an inner surface of the housing.

12. A vehicle, comprising:
- a console located adjacent to an armrest; and
- the mobile phone cradle of claim 1 provided in the console.

13. A vehicle, comprising:
- a console located adjacent to an armrest; and
- a mobile phone cradle provided in the console, wherein the mobile phone cradle comprises:
  - a housing received in the console;
  - a lower body displaceably received in the housing;
  - an upper body rotatably fixed to an upper portion of the lower body, wherein a mobile phone is held on the upper body;
  - a leaf spring, wherein one end of the leaf spring is selectively wound around a roller mounted to the housing and the other end of the leaf spring is fixed to the lower body;
  - a fixing member selectively fixing the lower body to the housing; and
  - a moving unit guiding displacement of the lower body inside the housing,
  - wherein the upper body is rotated at a predetermined angle when taken out of the housing by the leaf spring.

* * * * *